US008306740B2

(12) United States Patent
Muramatsu

(10) Patent No.: US 8,306,740 B2
(45) Date of Patent: Nov. 6, 2012

(54) VEHICLE TRAVEL ASSISTING SYSTEM

(75) Inventor: Satoru Muramatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 548 days.

(21) Appl. No.: 12/461,926

(22) Filed: Aug. 27, 2009

(65) Prior Publication Data

US 2010/0057342 A1 Mar. 4, 2010

(30) Foreign Application Priority Data

Aug. 28, 2008 (JP) ................. 2008-219600

(51) Int. Cl.
*G01C 21/34* (2006.01)
(52) U.S. Cl. ........ 701/417; 701/410; 701/415; 701/310; 340/988; 340/905; 340/993; 180/210; 180/212; 180/213
(58) Field of Classification Search ............ 701/25, 701/119, 200, 201, 117, 301; 340/988, 905, 340/993; 180/210, 212, 213
See application file for complete search history.

(56) References Cited

U.S. PATENT DOCUMENTS

| 2002/0027512 A1* | 3/2002 | Horita et al. ............ 340/988 |
| 2004/0024523 A1 | 2/2004 | Uotani |
| 2005/0165547 A1 | 7/2005 | Uotani |

FOREIGN PATENT DOCUMENTS

| JP | A-7-129888 | 5/1995 |
| JP | A-2002-156236 | 5/2002 |
| JP | A-2004-341795 | 12/2004 |
| JP | A-2006-071414 | 3/2006 |
| JP | A-2006-84250 | 3/2006 |
| JP | A-2007-040912 | 2/2007 |
| JP | A-2009-53185 | 3/2009 |

OTHER PUBLICATIONS

Office Action dated Jul. 12, 2011 in corresponding JP application No. 2008-219600 (and English translation).
Office Action dated Aug. 3, 2010 in corresponding JP application No. 2008-219600 (and English translation).

* cited by examiner

*Primary Examiner* — Thomas Black
*Assistant Examiner* — Luke Huynh
(74) *Attorney, Agent, or Firm* — Posz Law Group, PLC

(57) ABSTRACT

A vehicle travel assisting system has an area setting part for setting an area, in which weather information is acquired. The area setting part sets the area by using at least one of an attribute of a vehicle travel road, vehicle equipment for bad weather travel, and vehicle information such as a vehicle type and vehicle chassis lowest height. If the acquired weather information varies along a travel road of the vehicle, weather information is provided at earlier time according to the attribute of the travel road or unnecessary weather information is limited according to the equipment or the information of the vehicle.

9 Claims, 6 Drawing Sheets

| EQUIPMENT | WEATHER1 | WEATHER2 | WEATHER3 | IN-VEHICLE LAN | INPUT |
|---|---|---|---|---|---|
| TIRE CHAIN | SNOW COVER | FREEZE | — | × | ○ |
| STUDLESS TIRE | FREEZE | SNOW COVER | — | × | ○ |
| FOG LIGHT | FOG | — | — | ○ | ○ |
| ALL-WHEEL DRIVE | RAIN | SNOW COVER | FREEZE | ○ | ○ |
| ⋮ | ⋮ | ⋮ | ⋮ | ⋮ | ⋮ |

VEHICLE TRAVEL ASSISTING SYSTEM

CROSS REFERENCE TO RELATED APPLICATION

This application is based on and incorporates herein by reference Japanese Patent Application No. 2008-219600 filed on Aug. 28, 2008.

FIELD OF THE INVENTION

The present invention relates to a vehicle travel assisting system, which assists travel of a vehicle by using weather information.

BACKGROUND OF THE INVENTION

It is conventional to provide, by using a navigation apparatus for navigating a travel route to a travel destination, weather information about the travel destination or the navigation route. The navigation apparatus displays acquired weather information together with a map to attract attention of a vehicle user to weather condition.

According to a system disclosed in JP 2006-84250A, for example, a display device for displaying road map displays interrupt information including an expected course of a typhoon, when a travel destination or a present position is included within an area of influence of the typhoon. Thus, the system attracts attention of vehicle users to weather information about a travel direction and the like.

This system, however, fails to take into consideration characteristics of a vehicle and a travel road. For example, even if bad weather in a travel direction is warned in the course of traveling a road such as an expressway, which has few branch roads, it is often not possible any more to avoid the bad weather near a destination or a navigation route after passing a branch point. Some vehicles are fully equipped to be able to travel under bad weather. The warning of bad weather therefore occasionally causes unnecessary detour or rest, which will prolong travel time to the destination.

SUMMARY OF THE INVENTION

It is therefore an object of the present invention to provide a vehicle travel assisting system and method, which variably sets a weather information acquisition or notification area in accordance with characteristics of a travel road and a vehicle.

According to one aspect of the present invention, a vehicle travel assisting system and method incorporates a navigation apparatus, which displays a present position of a vehicle on a map displayed in a vehicle. This system acquires an attribute of a travel road, equipment information and vehicle information. The attribute of the travel road indicates a characteristic of the travel road on which the vehicle is. The equipment information indicates equipment mounted on the vehicle. The vehicle information indicates a type of the vehicle. The system sets a weather information acquisition area in accordance with at least one of the attribute of the travel road, the equipment information and the vehicle information. The system acquires weather information in a direction the vehicle travels, when the travel travels in the set weather information acquisition area.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE INVENTION

A vehicle travel assisting system according to the present invention will be described below in detail with reference to one embodiment.

Figure 1:
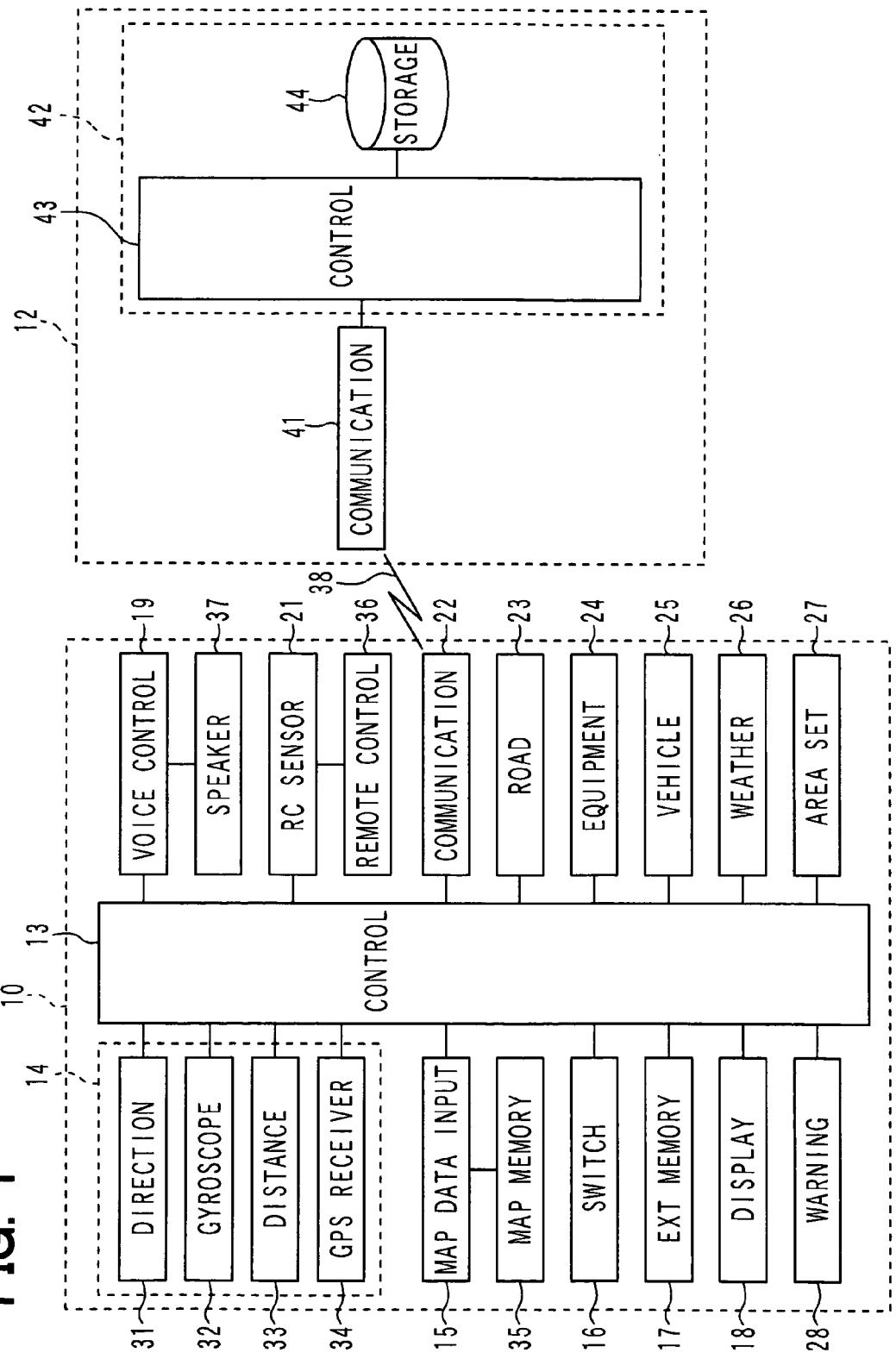
FIG. 1 is a block diagram showing an information station and an in-vehicle apparatus, which includes a vehicle travel assisting system according to one embodiment of the present invention.
Figure 3:
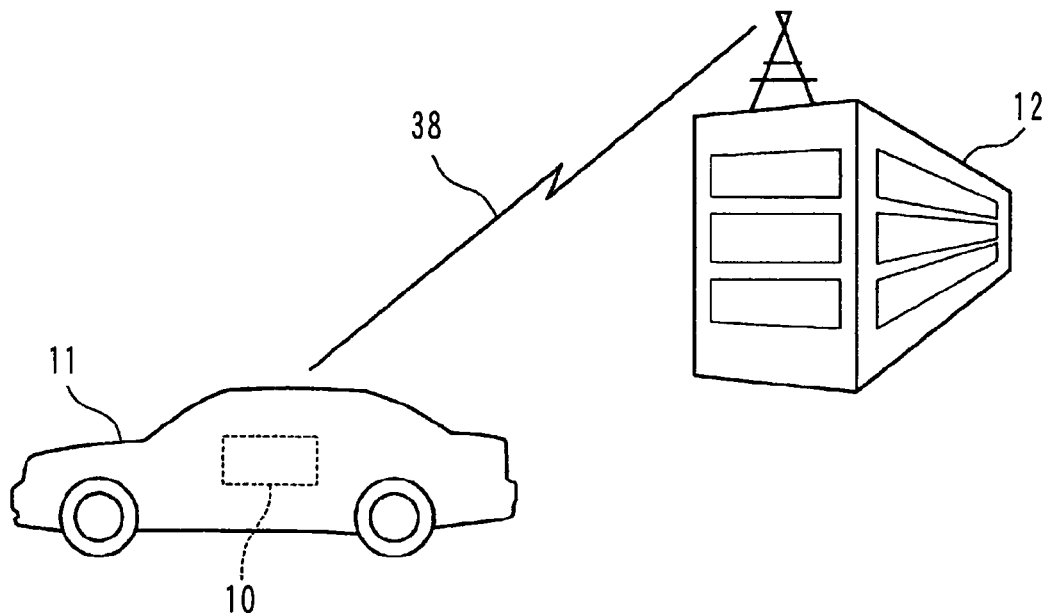
FIG. 3 is a schematic view showing the information station and the vehicle equipped with the in-vehicle apparatus according to the embodiment.

As shown in FIG. 1, a vehicle travel assisting system is incorporated in an in-vehicle apparatus 10 together with a navigation apparatus. The in-vehicle apparatus 10 is mounted in a vehicle 11 and receives a variety of information including weather information from an information station 12 as shown in FIG. 3. The weather information includes not only weather itself like sunny, cloudy, rainy and the like but also road conditions such as snow-covered, freezing and the like.

The in-vehicle apparatus 10 includes an electronic control unit 13, a position detector 14, a map data input device 15, an operation switch 16, an external memory 17, a display device 18, a voice controller 19, a remote controller sensor 21, a communication device 22, a road attribute acquisition device 23, a vehicle equipment acquisition device 24, a vehicle information acquisition device 25, a weather information acquisition device 26, a weather information acquisition area setting device 27 and a warning device 28. The control unit 13; is configured primarily with a microcomputer, which includes a CPU, a ROM, a RAM and the like. Some of the devices, for example, acquisition devices 24 to 26 and the area setting device 27 may be realized by the control unit 13 by its software processing.

The position detector 14 is configured to detect a present position of the travel vehicle 11, in which the in-vehicle apparatus 10 is mounted. The position detector 14 includes a direction (orientation) sensor 31, a gyroscope sensor 32, a distance sensor 33 and a GPS receiver 34. The direction sensor 31 is for detecting the direction in which the travel vehicle 11 is heading. The gyroscope sensor 32 is for detecting a rotation angle of the travel vehicle 11. The distance sensor 33 is for detecting a distance of travel of the travel vehicle 11. The GPS receiver 34 is for receiving radio waves transmitted from GPS satellites (not shown) thereby to determine the present position of the travel vehicle 11 by way of GPS (global positioning system).

The map data input device 15 is for acquiring map data from a map data memory device 35. The map data stored in the map data memory 35 includes a variety of data, such as road map data, eyemark data, map matching data, destination data and table data. The road map data is formed of a plurality of nodes and link connecting nodes. The table data is for converting traffic information into road data. The map data includes, as position names, location names, facility names and the like. The map data stored in the map data memory 35 is retrieved by the map data input device 15 by using a drive device (not shown). The map data memory 35 may be, for example, a large storage capacity medium such as a DVD or CD, or a storage medium such as a memory card or a hard disk drive.

The operation switch device 16 is configured with mechanical switches provided near a screen of the display device 18, touch panel switches provided on the screen of the display device 18, and the like. A vehicle user is thus allowed to input, by using each switch of the operation switch device 16, a variety of commands for switching over the travel destination of the travel vehicle 11 and display contents and display mode on the screen of the display device 18. The switch-over is, for example, change of map scale, selection of menu screen, search of travel route, initiation of navigation, correction of present position, change of sound volume and the like. Thus, the in-vehicle apparatus 10 operates as instructed by the user.

The remote controller sensor 21 is configured to transmit and receive commands to and from a remote controller 36. The remote controller 36 has a plurality of operation switches thereon. When the operation switches are manipulated by the user, the remote controller 36 transmits a variety of command signals to the control unit 13 through the remote controller sensor 21. The operation switch device 16 and the remote controller 36, which form input receiving means, can thus be used to instruct the control unit 13 to perform the same control function.

The external memory 17 is configured with, for example, a detachable flash memory card or had disk drive. The external memory 17 may be a part of the RAM or EEPROM provided in the control unit 13 of the in-vehicle apparatus 10 or a part of the map data memory 35. The display device 18 includes a color display device such as a liquid crystal or organic electroluminescence device. The display device 18 displays on its screen a map around the present position of the travel vehicle 11 in various scales. It also displays on the screen a present position mark, which indicates a present position and direction of travel of the vehicle 11, by superimposing the mark on the displayed map. It also displays on the screen a route guidance screen, when route guidance to the travel destination is performed.

The voice controller 19 is connected to a vehicle-mounted speaker 37. The voice controller 19 is configured to output a voice output signal of the control unit 13 to the speaker 37. The speaker 37 outputs voice sound, which includes guidance, explanation of manipulation, notification of operation of an anti-theft function, a talk-back corresponding to voice recognition result.

To navigate the travel vehicle 11 to the travel destination, the control unit 13 drives the display device 18 to display the road map including the present position and its surrounding area on the screen and superimposes the present position mark indicating the position and direction of the travel vehicle 11 on the displayed road. The present position mark is moved on the displayed map on the display device 18 in correspondence to travel of the vehicle 11. The map displayed on the display device 18 is scrolled in correspondence to the position of the travel vehicle 11. The control unit 13 is configured to perform map matching to match the present position of the vehicle 11 to the displayed road. The communication device 22 is configured to communicate with the information station 12 through a communication network 38, which may be wired or wireless.

The road attribute acquisition device 23 is configured to acquire or retrieve an attribute of a road, which the travel vehicle 11 travels. The map data stored in the map data memory device 35 includes the attribute of each road included in the map. From the map data, the road attribute acquisition device 23 acquires as one road attribute whether branch roads are connected to the travel road, which the travel vehicle 11 is traveling. In a case of a vehicle-dedicated road such as an expressway exclusive to vehicles, for example, the branch road is connected to the travel road at every interchange, that is, at an interval of several or tens of several kilometers.

Therefore, the road attribute acquisition device 23 acquires, as the road attribute, whether the travel road specified by the map matching is a vehicle-dedicated road such as the expressway, from which exiting to a branch road is limited. The road attribute acquisition device 23 may alternatively check whether any branch road is connected to the travel road near a point ahead of the present position of the travel road specified by the map matching. In a case of a local road in a suburban or sparsely-populated area, even a normal road other than the vehicle-dedicated road is scarcely connected to branch roads. Therefore, the road attribute acquisition device 23 acquires as road attribute information indicating whether the travel road is scarcely connected branch roads.

The vehicle equipment acquisition device 24 is configured to acquire information of equipment mounted on the travel vehicle 11 through a communication device such as an in-vehicle local area network (LAN), which connects the control unit 13 and various parts of the travel vehicle 11. The vehicle equipment acquired through the in-vehicle LAN includes, for example, fog lights, an all-wheel drive apparatus and the like. The vehicle equipment acquisition device 24 receives information about the vehicle equipment through the operation switch device 16 or the remote controller 36. The vehicle equipment is inputted by the user by manipulating the operation switch device 16 or the remote controller 36. The vehicle equipment inputted by the operation switch device 16 or the remote controller 36 and received by the vehicle equipment acquisition device 24 includes, for example, studless tires, tire chains and the like.

The vehicle information acquisition device 25 is configured to acquire vehicle information about the travel vehicle 11, which is pre-stored in the external memory 17. The vehicle information includes, for example, vehicle type, lowest chassis height from the ground (road surface) and the like. The vehicle type includes, for example, categories such as sports car, sedan, of off-road car. The vehicle type further includes, for example, categories such as bus and taxi for passenger transportation, or truck for cargo transportation. The lowest chassis height of the travel vehicle 11 of off-road cars, buses and trucks are higher than that of sports cars. The vehicle information acquisition device 25 acquires various information of the travel vehicle 11 stored, for example, in the external memory 17.

The weather information acquisition device 26 is configured to acquire weather information from the information station 12 through the communication device 22. The information station 12 is connected to the in-vehicle apparatus 10 of the travel vehicle 11 for communication through the communication network 38. The information station 12 is configured to transmit the weather information to the in-vehicle apparatus 10 via communication with the in-vehicle apparatus 10 through its communication device 41. The information station 12 includes a server 42 in addition to the communication device 41. The server 42 includes an electronic control unit 43, a data storage device 44 and the like. The storage device 44 stores therein database of weather information accumulated for transmission to the in-vehicle apparatus 10.

The server 42 collects weather information from time to time from organizations, which supply observation information about weather, and stores weather information over comparatively wide areas. The weather information is stored in respect of each predetermined zone of the map. The predetermined zone may be a section divided into a grid by latitude and longitude or a section divided by an administration unit such as city, town and the like. The zone may also be a section of polygonal shape indicating a shape of county, city or the like. The weather information stored in the weather information database includes, for example, weather warning such as tornado or flood, present weather condition, expected weather condition after the present time, and road information such as freeze or flood. The weather information acquisition device 26 acquires the stored weather information from the information station 12.

The area setting device 27 is configured to set, as a weather information acquisition area, an area in which the weather information acquisition device 26 acquires the weather information. This acquisition area is set based on at least one of the attribute of the travel road acquired by the road attribute acquisition device 23, the vehicle equipment acquired by the vehicle equipment acquisition device 24 and the vehicle information acquired by the vehicle information acquisition device 25. The warning device 28 issues a warning, when the weather information acquired in respect of the acquisition area includes information of high probability of danger. The warning issued by the warning device 28 should appeal to any one of five senses of the user, and may includes, for example, visual warning by the display device 18, audible warning by the speaker 37, sensible warning by vibration and the like.

The in-vehicle device 10 is configured to operate as follows.

(Setting of Weather Information Acquisition Area by Road Attribute)

Figure 2:
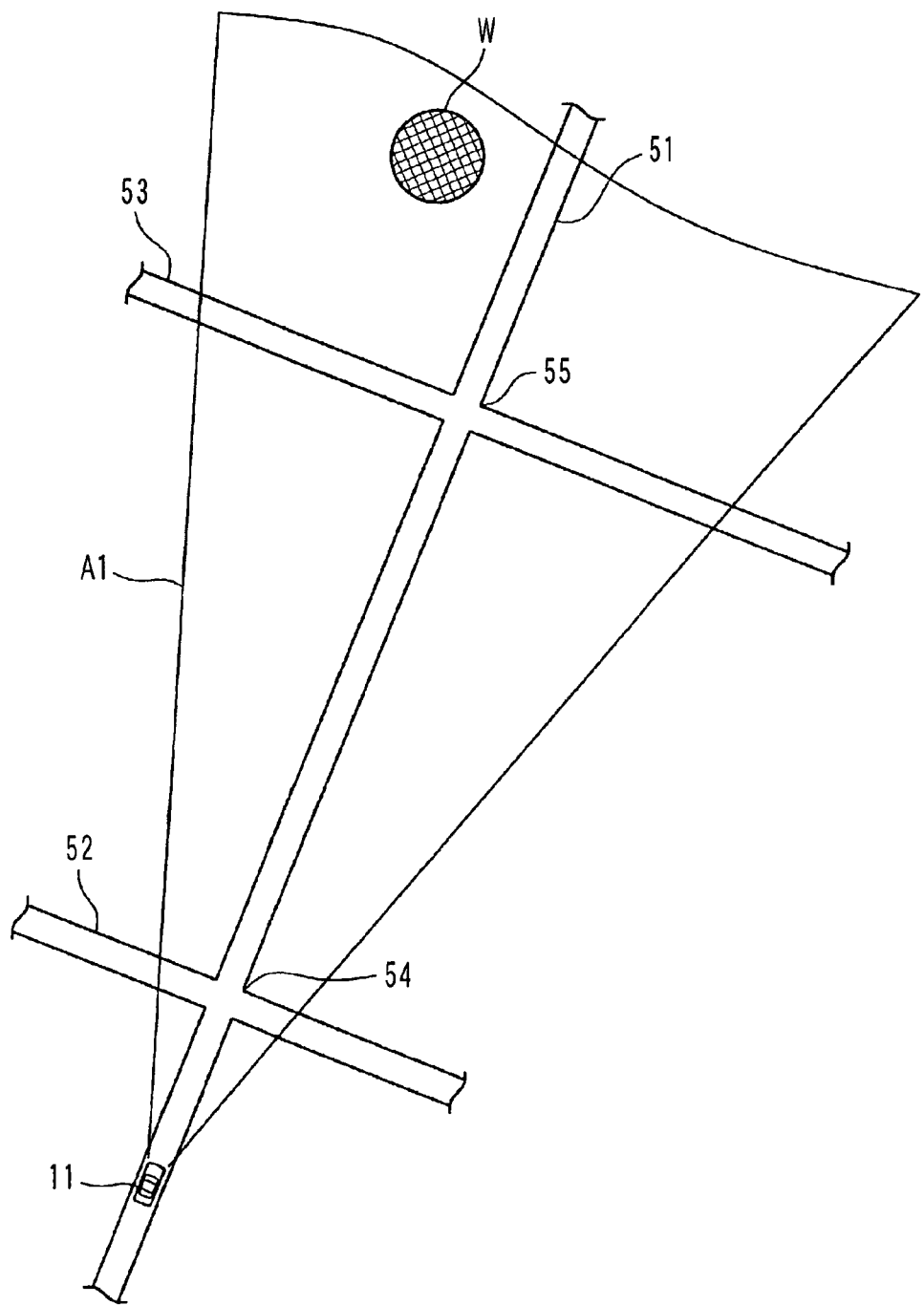
FIG. 2 is a schematic view showing a relation between a vehicle, which is equipped with the in-vehicle apparatus according to the embodiment, and a weather information acquisition area.
Figure 4:
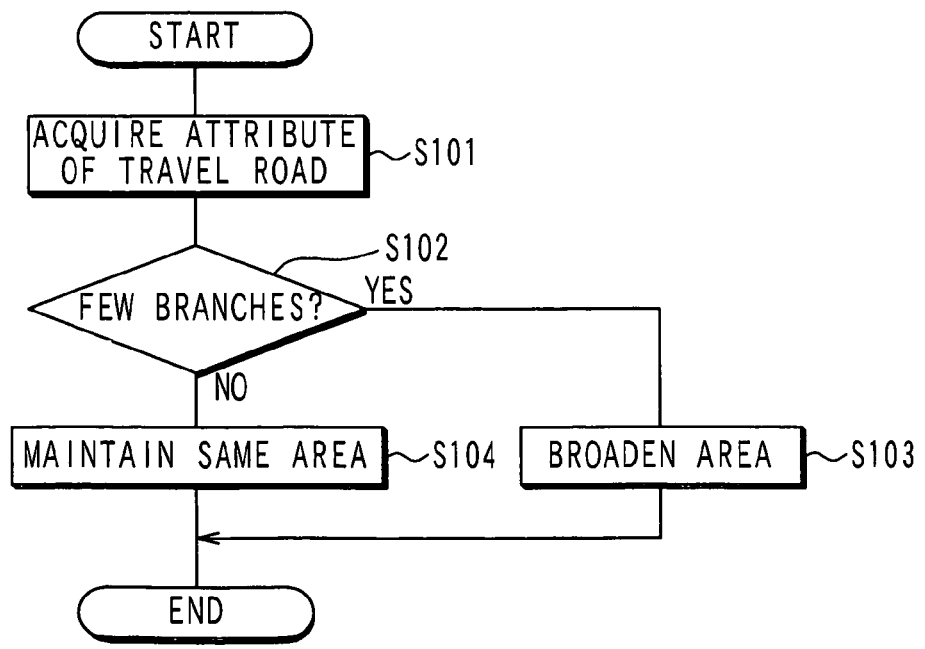
FIG. 4 is a flowchart showing processing of setting a weather information acquisition area in accordance with attributes of vehicle travel roads, which is performed by the in-vehicle apparatus according to the embodiment.

It is assumed here that, as shown in FIG. 2, the travel vehicle 11 mounted with the in-vehicle apparatus 10 is on a travel road 51, to which branch roads 52 and 53 are connected. The branch roads 52 and 53 cross the travel road 51 at junctions 54 and 55, respectively. The weather information acquisition area setting is performed based on the road attribute as shown in FIG. 4.

The in-vehicle apparatus 10 (specifically acquisition area setting device 27) acquires the attribute of the travel road 51 at S101. In this instance, the in-vehicle apparatus 10 (road attribute acquisition device 23) acquires the attribute of the travel road 51 from the map data stored in the map data memory 35. Specifically, the in-vehicle apparatus 10 acquires the attribute specific to the travel road 51, which indicates whether the travel road 51 is a road such as an expressway or a vehicle-dedicated road having interchanges, and whether the travel road 51 is connected to few branch roads. The acquired attribute of the travel road 51 is supplied from the road attribute acquisition device 23 to the acquisition area setting device 27.

The in-vehicle apparatus 10 (specifically, acquisition area setting device 27) checks at S102 whether the attribute of the travel road 51 acquired at S101 is a road, which is scarcely connected to branch roads 52, 53. The in-vehicle apparatus 10 broadens at S103 the acquisition area, in which the weather information is acquired, if the attribute of the travel road 51 indicates few connections to branch roads (YES). The in-vehicle apparatus 10 maintains the same area at S104 without changing the acquisition area, if the attribute of the travel road 51 indicates many connections to branch roads (NO). The in-vehicle apparatus 10 (specifically warning device 28) issues a warning to the user, if a predetermined warning location W is included in the broadened acquisition area A1 as shown in FIG. 2. The warning location W is, for example, an area of bad weather such as snow cover, freeze, flood, and the like.

Figure 5:
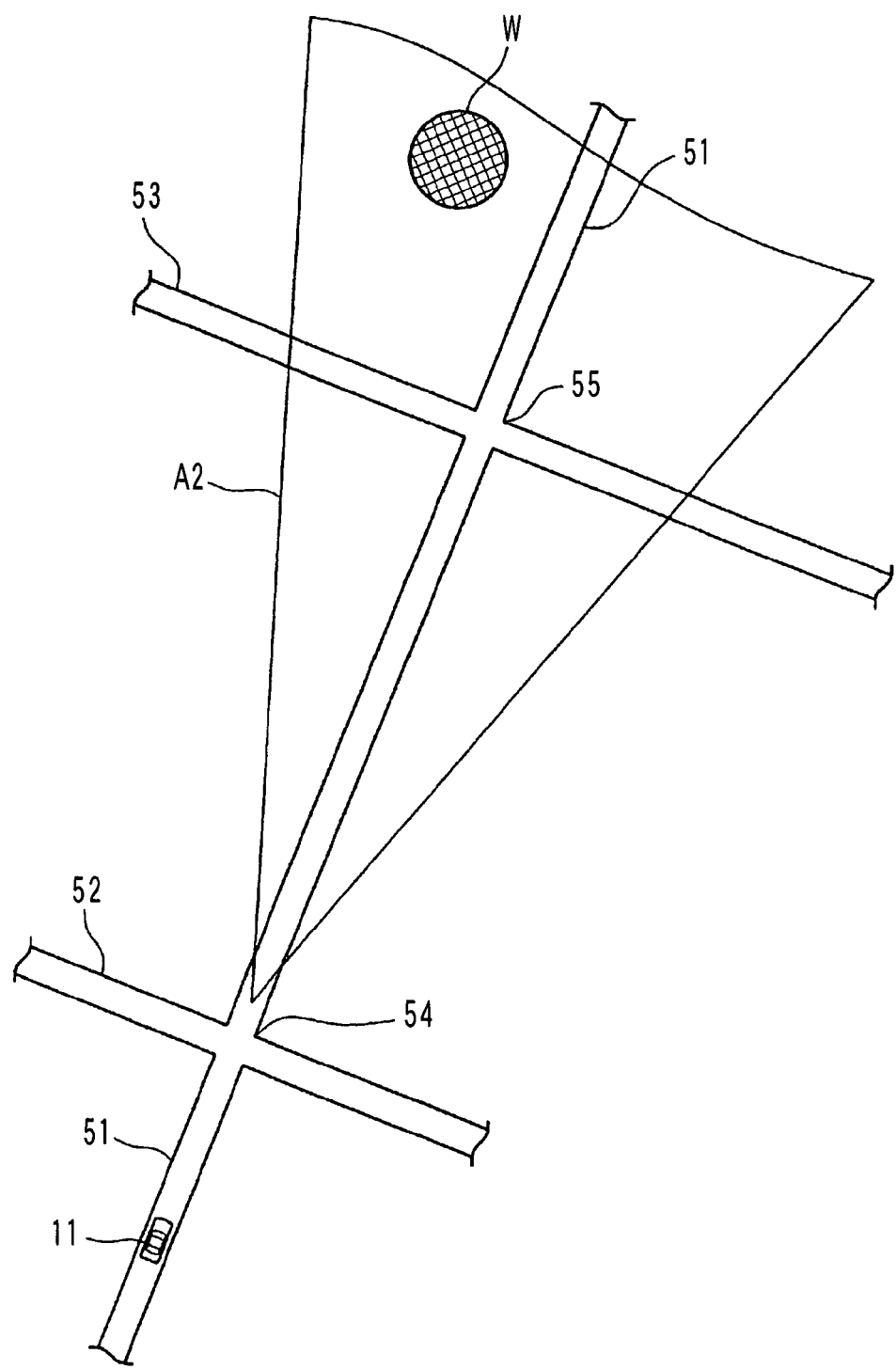
FIG. 5 is a schematic view showing a relation between a vehicle and a weather information acquisition area in a comparative vehicle travel assisting system.

In this operation, the in-vehicle apparatus 10 broadens acquisition area A1 at S103 to substantially include the present location of the travel vehicle 11 as shown in FIG. 2 from a weather information acquisition area A2 shown in FIG. 5. The weather information acquisition area A2 is set to start from the travel vehicle 11 and expand in the forward longitudinal direction and the lateral direction. The in-vehicle apparatus 10 normally sets the acquisition area A2, which is ahead of the travel vehicle 11 and does not include the present position of the travel road 11. The acquisition area A2 is set away from the travel vehicle 11 in the travel direction of the travel vehicle 11 in consideration of a travel speed and a travel destination of the travel vehicle 11. If the junction 55 of the branch road 53 is far away from the junction 54 of the branch road 52 like in the case of expressway, the travel vehicle 11 cannot change the travel road until it reaches the junction 55 after passing the junction 54. For this reason, the travel vehicle 11 traveling the travel road 51 necessarily approaches the warning location W, which is predetermined to be the object of warning included in the acquisition area A2.

Therefore, the in-vehicle apparatus 10 broadens the acquisition area A1 to be close to the present travel position as shown in FIG. 2. The acquisition area A1 is broadened to cover the junction 54 of the branch road 52, which is close to the travel vehicle 11 in the travel direction. Thus, the travel vehicle 11 can have sufficient distance and time until it reaches the junction 54. As a result, even if the warning location W is included in the acquisition area A1, the vehicle user of the travel vehicle 11 traveling on the travel road 51 can determine whether the vehicle user should change its travel road at the junction 54 well before approaching too close to the warning location W. The travel vehicle 11 can thus change its travel roads more often to avoid the warning location W.

As described above, the in-vehicle apparatus 10 sets the acquisition area, in which the weather information is acquired, based on the attribute of the travel road 51 of the travel vehicle 11. Therefore, even in the case that the number of the branch roads 52, 53 branching from the travel road 51 is less than a predetermined number (for example, 2) like expressways or local roads in less-populated area, the travel vehicle 51 is enabled to change its travel road 51 to a branch road 52 or 53 before reaching too close to the warning location W, near which vehicles are recommended to avoid for safety travel.

(Setting of Weather Information Acquisition Area by Vehicle Equipment)

Figure 6:
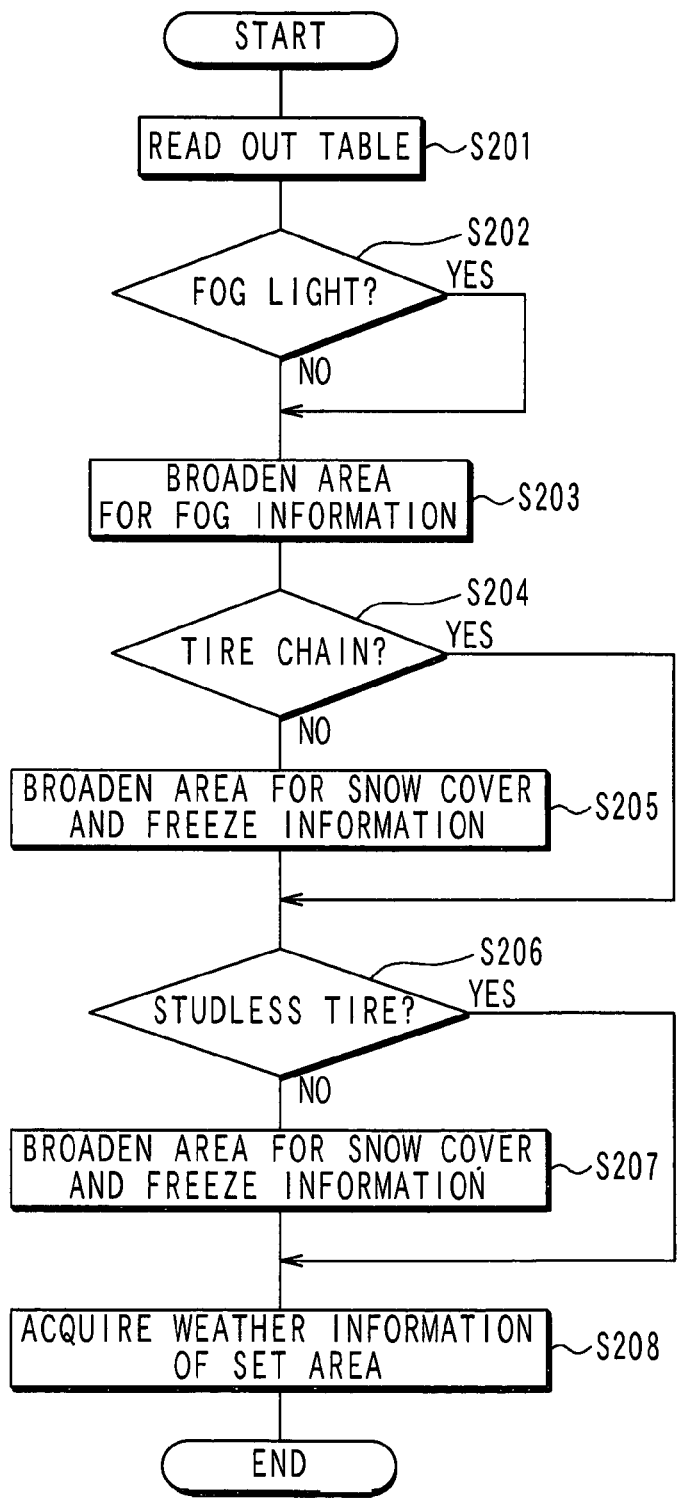
FIG. 6 is a flowchart showing processing of setting a weather information acquisition area in accordance with equipment of the vehicle, which is performed by the in-vehicle apparatus according to the embodiment.
Figures 7, 8:
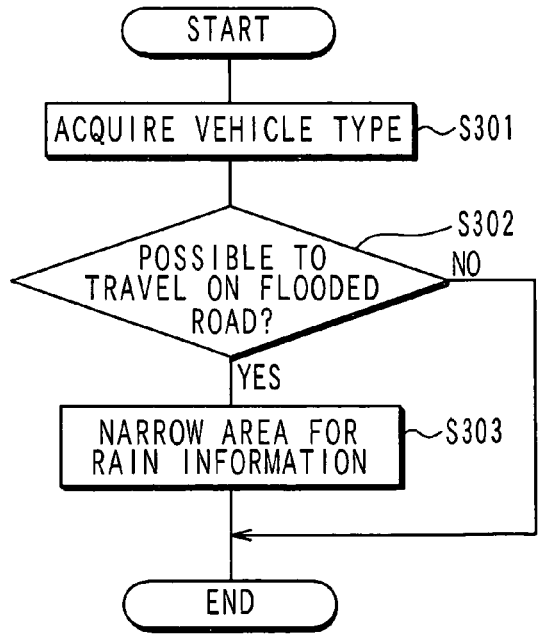
FIG. 7 is a table showing an example of data stored in the in-vehicle apparatus according to the embodiment.
FIG. 8 is a flowchart showing processing of setting a weather information acquisition area in accordance with vehicle information, which is performed by the in-vehicle apparatus according to the embodiment.

The setting of the weather information acquisition area is performed based on the equipment mounted on the travel vehicle 11 as shown in FIG. 6. The in-vehicle device 10 (specifically area setting device 27) reads out at S201 a table (data) 60, which defines a relation between various equipment of the travel vehicle 11 and weather conditions as shown in FIG. 7. The table 60 is pre-stored in the external memory 17.

The table 60 defines the following relation for example.

If the travel vehicle 11 is equipped with tire chains, this equipment is defined to correspond to "snow cover" and "freeze" among weather conditions. If the travel vehicle 11 is equipped with studless tires, this equipment is defined to correspond to "freeze" and "snow cover" among weather conditions. If the travel vehicle 11 is equipped with fog lights, this equipment is defined to correspond to "fog" among weather conditions. If the travel vehicle 11 is equipped with an all-wheel drive apparatus, this equipment is defined to correspond to "rain," "snow cover," and "freeze" among weather conditions. The table 60 further defines whether the information about such equipment of the travel vehicle 11 can be acquired by the in-vehicle LAN or by user input on the operation switch device 16 or remote controller 36. The information, which can be acquired and cannot be acquired, is indicated by ○ and x in FIG. 7, respectively.

If the equipment is the tire chain or the studless tire, it cannot be acquired through the in-vehicle LAN. Therefore such information should be acquired only by manipulation of users on the operation switch device 16 or the remote controller 36. Other information such as the fog light or the all-wheel drive apparatus can be acquired by either the in-vehicle LAN or the operation switch device 16, the remote controller 36.

The in-vehicle device 10 sets the acquisition area with reference to the acquired information of the table 60. Specifically, the in-vehicle device 10 checks at S202 whether the travel vehicle 11 is equipped with fog lights. If the fog lights are equipped (YES), the travel vehicle 11 is expected to be able to travel in the fog. Therefore, the in-vehicle device 10 does not change the normal acquisition area. If no fog lights are equipped (NO), the travel vehicle 11 is expected to be unable to travel in the fog safely. Therefore, the in-vehicle device 10 broadens at S203 the acquisition area, in which the weather information should be acquired, to be broader and hence closer to the travel vehicle 11 as shown in FIG. 2. As a result, the in-vehicle device 10 can acquire the weather information regarding fog in the broadened area, so that the user of the travel vehicle 11 can take necessary actions such as changing the travel road well in advance if the travel vehicle 11 will have to travel in the fog.

The in-vehicle device 10 checks at S204 whether the travel vehicle 11 is equipped with tire chains. If the tire chains are equipped (YES), the travel vehicle 11 is expected to be able to travel on snow-covered roads and freezing roads. Therefore, the in-vehicle device 10 does not change the present acquisition area, and maintains the normal acquisition area or the acquisition area broadened at S203. If no tire chains are equipped (NO), the travel vehicle 11 is expected to be unable to travel on snow-covered roads or freezing roads safely. Therefore, the in-vehicle device 10 broadens at S205 the acquisition area, in which the weather information should be acquired, to be broader than the normal acquisition area or the acquisition area broadened at S203. As a result, the in-vehicle device 10 can acquire and provide snow cover or freeze information over the broadened area, so that the user of the travel vehicle 11 can take necessary actions such as changing the travel road well in advance if the travel vehicle 11 will have to travel the snow-covered or freezing road.

The in-vehicle device 10 checks at S206 whether the travel vehicle 11 is equipped with studless tires. If the studless tires are equipped (YES), the travel vehicle 11 is expected to be able to travel on snow-covered roads and freezing roads. Therefore, the in-vehicle device 10 does not change the present acquisition area, and maintains the normal acquisition area or the acquisition area broadened at S203 or S205. If no studless tires are equipped (NO), the travel vehicle 11 is expected to be unable to travel on snow-covered roads or freezing roads safely. Therefore, the in-vehicle device 10 broadens at S207 the acquisition area, in which the weather information of snow cover and freeze should be acquired, to be broader than the normal acquisition area or the acquisition area broadened at S203 or S205. As a result, the in-vehicle device 10 can acquire and provide snow cover or freeze information over the broadened area, so that the user of the travel vehicle 11 can take necessary actions such as changing the travel road well in advance if the travel vehicle 11 will have to travel the snow-covered or freezing road.

The in-vehicle device 10 (specifically weather information acquisition device 26) acquires at S208 various weather information about the acquisition area, which are variably set at S203, S205 and S207, from the information station 12. The in-vehicle device 10 (specifically warning device 28) issues a warning if the warning location W is included in the acquisition area.

The in-vehicle device 10 (specifically the area setting device 27) may further vary the acquisition area based on whether the travel vehicle 11 is a all-wheel drive type. For example, the in-vehicle device 10 checks whether the travel vehicle 11 is equipped with an all-wheel drive apparatus. If the all-wheel drive apparatus is equipped, the travel vehicle 11 is expected to be able to travel in rain and on snow-covered roads and freezing roads. Therefore, the in-vehicle device 10 does not change the present acquisition area, and maintains the normal acquisition area or the broadened acquisition area. If no all-wheel drive apparatus is, equipped, the travel vehicle 11 is expected to be unable to travel in rain or on snow-covered roads or freezing roads safely. Therefore, the in-vehicle device 10 broadens the acquisition area, in which the weather information of rain, snow cover and freeze should be acquired, to be broader than the normal acquisition area or the broadened acquisition area. As a result, the in-vehicle device 10 can acquire and provide the weather information such as rain, snow cover or freeze information over the broadened area, so that the user of the travel vehicle 11 can take necessary actions such as changing the travel road well in advance if the travel vehicle 11 will have to travel in the rain on the snow-covered or freezing road.

As described with reference to FIG. 6, the in-vehicle device 10 sets the acquisition area variably with the equipment of the travel vehicle 11. Therefore, even in the case that the travel vehicle 11 will be subjected a variety of weather conditions in the course of its travel, it becomes more easy to avoid the bad weather condition before approaching the warning location included in the weather information acquisition area. Since the in-vehicle device 10 sets the acquisition area variably with the variety of equipment of the travel vehicle 11, it becomes possible to not only avoid bad weather conditions at earlier time but also unnecessary warning can be reduced and the weather information can be provided at appropriate time.

In the example of FIG. 6, the in-vehicle device 10 acquires the equipment information in the order of fog lights, tire chains and studless tires. However, this order of acquiring vehicle equipment information may be changed.

(Setting Weather Information Acquisition Area by Vehicle Type)

The acquisition area setting is also performed based on a type of the travel vehicle 11 as shown in FIG. 8.

The in-vehicle device 10 (specifically the vehicle information acquisition device 25) acquires at S301 the type of the travel vehicle 11 stored in the external memory 17. The type may be a model such as sport car or off-road car or specification such as chassis lowest height.

The in-vehicle device 10 (specifically acquisition area setting device 27) checks at S302 whether the travel vehicle 11 is able to travel flooded road, which is covered with water, based on the type of the vehicle acquired at S301. If the travel vehicle 11 is the off-road type or the chassis lowest height is more than a predetermined height, that is, the floor of the vehicle is rather high, the travel vehicle 11 is expected to be able to travel the flooded load. If the travel vehicle 11 is the sports car type or the chassis lowest height is less than the predetermined height, that is, the floor of the vehicle is rather low, the travel vehicle 11 is expected to be unable to travel the flooded road.

If the in-vehicle device 10 determines that the travel vehicle 11 can travel on the flooded road (YES), the in-vehicle device 10 narrows at S303 the acquisition area for acquiring the weather information. As a result, it is avoided that the weather information about rain or flood is supplied unnecessarily to the travel vehicle 11, which can travel even the flooded road. If the in-vehicle device 10 determines that the travel vehicle 11 cannot travel on the flooded road (NO), the in-vehicle device 10 does not narrow the acquisition area for acquiring the weather information about rain, particularly flood. In this instance, the normal acquisition area may be maintained or broadened. The warning device 28 issues the warning of the warning location W, when the warning location is included in the acquisition area.

As described with reference to FIG. 8, the in-vehicle device 10 sets the acquisition area variably with a type of the travel vehicle 11. Specifically, if the travel vehicle 11 is capable of traveling the flooded road like an off-road car, the acquisition area for acquiring the weather information about rain is narrowed, so that issuance of warning of the warning location W is limited.

The in-vehicle device 10 may check whether the vehicle type is for the passenger transportation. If the travel vehicle 11 is a bus or taxi for passenger transportation, higher safety is required than that of the vehicle like a truck for cargo transportation. Therefore, if the travel vehicle 11 is for passenger transportation, the acquisition area is preferably broadened so that the travel safety is ensured by acquiring the information of bad weather at the earlier time.

As described above, according to the embodiment, the acquisition area setting device 27 sets the acquisition area by using at least one of the attribute of the road 51, which the travel vehicle 11 travels, the equipment of the travel vehicle 11 and the vehicle information. Although the embodiment is described as setting the acquisition area separately, the acquisition setting device 27 sets the time to provide the weather information by combining these settings. As a result, in a case that there are various weather information with respect to forward areas in the direction of the vehicle travel road 51, the weather information can be provided at the earlier time in accordance with the attribute of the travel road 51 or unnecessary supply of weather information can be limited or prohibited in accordance with the equipment or the characteristics of the travel vehicle 11. Thus, the weather information can be provided at appropriate time.

The present invention is not limited to the disclosed embodiment, but may be implemented in many other embodiments. For example, in place of setting the weather information acquisition area variably in accordance with characteristics of the travel road and/or the travel vehicle, a weather information notification area may be set variably in accordance with characteristics of the travel road and/or the travel vehicle while acquiring weather information from the external information without limitation.

What is claimed is:

1. A vehicle travel assisting system comprising:
a navigation apparatus configured to display a present position of a vehicle on a map displayed in the vehicle;
attribute acquiring means for acquiring an attribute of a travel road, on which the vehicle is, from the navigation apparatus;
equipment acquiring means for acquiring equipment information about equipment, which is mounted on the vehicle;
vehicle information acquiring means for acquiring vehicle information including a type of the vehicle;
weather information acquiring means for acquiring weather information about weather in a direction the vehicle travels; and
area setting means for setting an acquisition area, in which the weather information acquiring means acquires the weather information, in accordance with at least one of the attribute of the travel road, the equipment information and the vehicle information,
wherein
the attribute acquiring means acquires, as the attribute of the travel road, predetermined information among map information stored in the navigation apparatus, the predetermined information indicating whether the travel road has branch roads connected to the travel road, and
the area setting means broadens the acquisition area to be closer to the travel vehicle, when the attribute of the travel road indicates that the travel road has few branch roads.

2. The vehicle travel assisting system according to claim 1, wherein the vehicle information acquiring means acquires, as the vehicle information, predetermined information indicating whether the travel vehicle is for passenger transportation.

3. The vehicle travel assisting system of claim 1, wherein
the area setting means judges that the travel road has few branch roads when the information about the travel road indicates that the travel road has less branch roads in a forward area of the vehicle than a predetermined number and the information about the vehicle indicates that the vehicle has lower ability of travel on the travel road in the forward area of the vehicle than a predetermined ability, and
the area setting means does not broaden the acquisition area, when the attribute of the travel road does not indicate that the travel road has few branch roads.

4. The vehicle travel assisting system according to claim 1, wherein the equipment acquiring means includes communication means for acquiring the equipment information through an in-vehicle communication device.

5. The vehicle travel assisting system according to claim 1, wherein the vehicle information acquiring means acquires, as the vehicle information, a vehicle chassis lowest height of the travel vehicle.

6. A vehicle travel assisting method comprising:
displaying a present position of a vehicle on a map of a road displayed in the vehicle to navigate the vehicle to a travel destination;

acquiring information about a travel road, which the vehicle travels to the travel destination;

acquiring information about the vehicle, which corresponds to ability of travel of the vehicle under different weather conditions;

setting variably a weather information acquisition area, in which the vehicle acquires weather information from an external information station, in accordance with acquired information about the travel road and the vehicle; and acquiring the weather information only when a set acquisition area includes the present position of the vehicle to notify acquired weather information in the vehicle, wherein the step of setting variably the weather information acquisition area broadens the weather information acquisition area to substantially include the present position of the vehicle as the information about the travel road indicates that the travel road has less branch roads in a forward area of the vehicle than a predetermined number and the information about the vehicle indicates that the vehicle has lower ability of travel on the travel road in the forward area of the vehicle than a predetermined ability, the weather information acquisition area being normally set to exclude the present position of the vehicle.

7. The vehicle travel assisting method of claim 6, further comprising determining whether the travel road has few branch roads in the situation that both (i) the information about the travel road indicates that the travel road has less branch roads in the forward area of the vehicle than the predetermined number and (ii) the information about the vehicle indicates that the vehicle has lower ability of travel on the travel road in the forward area of the vehicle than the predetermined ability, and canceling the step to broaden the weather information acquisition area, when the attribute of the travel road does not indicate that the travel road has few branch roads.

8. A vehicle travel assisting method comprising:

displaying a present position of a vehicle on a map of a road displayed in the vehicle to navigate the vehicle to a travel destination;

acquiring information about a travel road, which the vehicle travels to the travel destination;

acquiring information about the vehicle, which corresponds to ability of travel of the vehicle under different weather conditions;

acquiring weather information from an external information station;

setting variably a weather information notification area, in which the vehicle notifies acquired weather information regarding the travel road, in accordance with acquired information about the travel road and the vehicle; and notifying the acquired weather information in the vehicle only in a set weather information notification area, wherein the step of setting variably the weather information notification area broadens the weather information acquisition area to substantially include the present position of the vehicle as the information about the travel road indicates that the travel road has less branch roads in a forward area of the vehicle than a predetermined number and the information about the vehicle indicates that the vehicle has lower ability of travel on the travel road in the forward area of the vehicle than a predetermined ability, the weather information notification area being normally set to exclude the present position of the vehicle.

9. The vehicle travel assisting method of claim 8, further comprising determining whether the travel road has few branch roads in the situation that both (i) the information about the travel road indicates that the travel road has less branch roads in the forward area of the vehicle than the predetermined number and (ii) the information about the vehicle indicates that the vehicle has lower ability of travel on the travel road in the forward area of the vehicle than the predetermined ability, and canceling the step to broaden the weather information notification area, when the attribute of the travel road does not indicate that the travel road has few branch roads.

* * * * *